UNITED STATES PATENT OFFICE.

HENRY C. LAWRENCE, OF CHICAGO, ILLINOIS.

PROCESS OF PREPARING MEDICAL COMPOUNDS.

SPECIFICATION forming part of Letters Patent No. 298,000, dated May 6, 1884.

Application filed November 30, 1883. (No specimens.)

*To all whom it may concern:*

Be it known that I, HENRY C. LAWRENCE, a citizen of the United States, residing at the city of Chicago, in the State of Illinois, have invented a new and useful Mode of Preparing a Medical Compound, of which the following is the specification.

The nature and object of this invention are to produce a medical compound as a remedy for bronchial difficulties and for pulmonary and throat diseases.

The basis of this medical compound is balsam of tolu. To make this medical compound I take about forty-two gallons of ninety-four per cent. alcohol and heat it to about 212°—that is, I bring the alcohol to a boiling-point—in which I then dissolve about forty-five pounds of ordinary balsam of tolu of commerce, and to this solution I slowly add about fifty gallons of boiling water. As the water is being poured into the solution, I add about thirty-six pounds of carbonate of lime or precipitate of chalk, which is first reduced to an impalpable powder and sifted free from all lumps and impurities. This mixture is allowed to stand four or five days, or until all the lime has settled to the bottom, leaving the liquid in a perfectly clear state, and holding in suspense or solution the tolu. The office of the carbonate of lime is to clarify the liquid and to throw down all the impurities found in the balsam of tolu, and to hold and keep in solution the tolu. Little or none of the tolu is carried down with the lime, it being retained and kept in suspense or solution in the liquid. When prepared and permanently solved, blended, and united, as above described, I take about fifteen gallons of the liquid and add to it as follows: forty-five gallons of whisky, six gallons of rock-candy sirup, and twenty-two gallons of water, and thoroughly mix them. It is now ready for use.

In the above paragraph I have mentioned specific amounts of elements entering into the compound. I do not confine myself to these specific amounts, as they might be varied and not change or alter the nature of the compound which I make. In this compound, prepared as above shown, I am able to successfully use, employ, and keep all the tolu.

A medical compound with the balsam of tolu as a base, made as herein shown, is palatable and pleasant to take.

I disclaim as to all kinds of alcoholic bitters and patent medicines of like character; but

What I claim is—

In a process for making a medical compound composed of spirits, balsam of tolu, sirup, and water, the method of retaining and blending a maximum amount of tolu by heating the alcohol, then adding the tolu and boiling water, and then clarifying the same with carbonate of lime or precipitate of chalk, as set forth.

HENRY C. LAWRENCE.

Witnesses:
JAS. A. COWLES,
CHAS. E. BYRNE.